Dec. 3, 1963 W. G. WILLINGER 3,112,595
ROTARY MOWER WITH SWIVEL CASING
Filed March 1, 1962
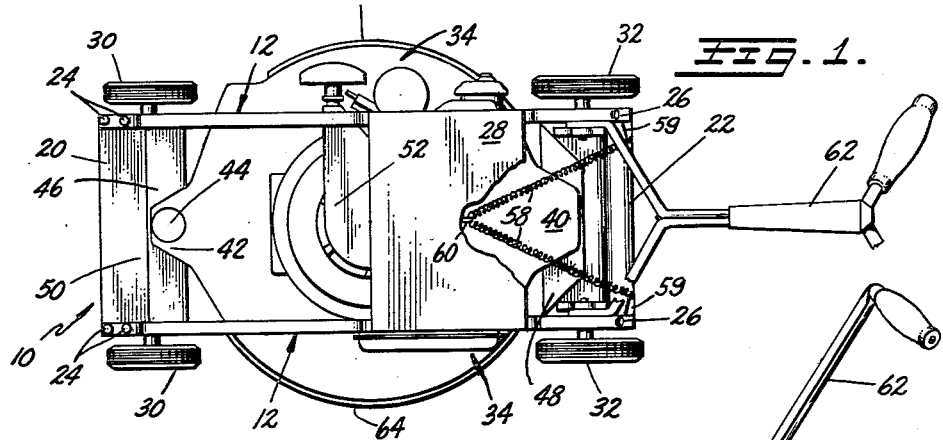
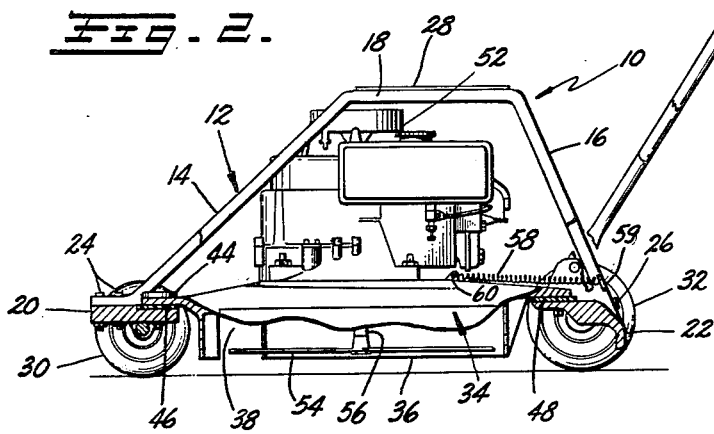
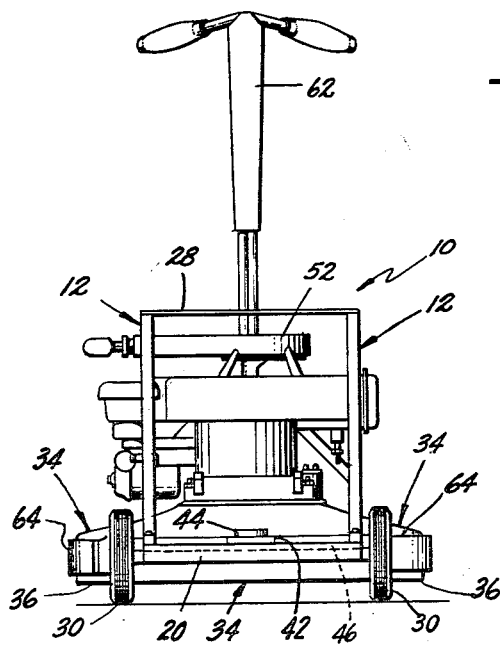
INVENTOR.
WILLIAM G. WILLINGER
BY
Meyers & Peterson
ATTORNEYS 3,112,595
ROTARY MOWER WITH SWIVEL CASING
William G. Willinger, 173 S. Leonard St.,
West Salem, Wis.
Filed Mar. 1, 1962, Ser. No. 176,636
5 Claims. (Cl. 56—25.4)

This invention relates generally to rotary mowers, and pertains more particularly to a rotary mower having a swivel casing.

One object of the invention is to provide a rotary mower than can cut quite close to obstacles of various sorts, thereby minimizing or obviating subsequent trimming. More specifically, the invention has for an aim the provision of a rotary mower than can readily cut quite close to cemetery monuments, trees and along buildings of various types. With respect to cutting grass in cemeteries, the invention permits this to be done very easily and without damage to the monuments or stones. It will be appreciated that considerable maintenance is associated with the proper care of cemeteries, and every effort is made to reduce the costs of such care. Accordingly, although not limited thereto, the present invention will find especial utility in the maintenance of cemetery lawns.

Another object of the invention is to provide a rotary mower that is usually handled in the same manner as a conventional mower, but which has a casing that readily yields when an obstruction is encountered, the casing always returning to a normal or centrally disposed position after the mower has moved by the obstacle. Thus, where no obstacles are met, the mower is operated in a fashion like any prior art mower.

A further object of the invention is to provide a mower that will permit the cutting of grass close to various obstacles, yet which mower will not cost much more than a conventional one.

These and other objects and advantages of this invention will more fully appear from the following description, made in connection with the accompanying drawing, wherein like reference characters refer to the same or similar parts throughout the several views and in which:

FIGURE 1 is a top plan view of one form my rotary mower can assume;

FIGURE 2 is a side elevational view corresponding to FIGURE 1, a portion of the casing having been broken away in order to show the cutting blade, and FIGURE 3 is a front elevational view of the mower depicted in FIGURES 1 and 2.

Referring now in detail to the drawing, the rotary mower that has been selected for the purpose of exemplifying the invention comprises a frame 10. The frame 10 includes a pair of laterally spaced side members 12 in the form of rods or tubes. From FIGURE 2 it will be discerned that each of the side members 12 has an upwardly inclining forward portion 14, an upwardly inclining rear portion 16, and an elevated horizontal portion 18 intermediate the portions 14 and 16.

The frame 10 further includes a forwardly disposed transverse plate 20 and a rearwardly disposed transverse plate 22. A pair of bolts 24 serve to anchor the forward ends of the side members 12 to the transverse plate 20, whereas one bolt 26 at the rear ends of the side members functions to anchor these ends to the transvers plate 22. For the purpose of adding rigidity to the frame, the frame additionally includes an upper transverse plate 28 that can be brazed or welded to the horizontal portions 18.

A pair of wheels 30 are journaled to the forwardly disposed transverse plate 20, and a similar pair of wheels are journaled to the rear transverse plate 22.

A casing 34 is formed with a generally cylindrical side wall or skirt 36 having a discharge opening at 38. It will be observed that the periphery of the side wall 36 extends beyond the wheels 30 and 32; in other words, the diameter of the casing 34 is greater than the lateral spacing of the wheels 30, 32. A rear horizontal flange 40 is integral with the rear side of the casing 34, and a forward horizontal flange 42 is integral with the forward side of the casing 34. The forward flange 42 is pivotally connected to the transverse plate 20 through the agency of a pin 44. Although not essential to a practicing of the invention, it is preferred that a sheet or strip 46 of nylon, Teflon or the like be positioned between the flange 42 and the plate 20, thereby facilitating the swivel movement of the casing 34. As best shown in FIGURE 2, the plate 20 is recessed somewhat for the accommodation of the plastic 46 but the recess is not actually necessary. The casing 34 is supported at its rear side through the instrumentality of the flange 40 which is free to shift to either side. Assisting in rendering the casing 34 readily pivotal is a sheet 48 of material similar to that of the sheet 46. It will be appreciated that a greater mechanical advantage is obtained by pivotally attaching the casing 34 to the forward plate 20 rather than the rear plate 22.

A conventional motor 52 is carried on the upper side of the casing 34. A grass cutting blade 54 is secured to the lower end of the motor shaft 56 so that the blade is thereby driven by the motor 52 in the performing of the grass cutting operation.

Since it is planned that the casing 34 be deflected by any obstacle that it encounters, provision is made for the return of the casing 34 to a normal or centrally disposed position with respect to the frame 10. To achieve this result, a pair of coil springs 58 have one end thereof attached to fixed points, such as the ears 59 on the side members 12. The other ends of the coil springs 58 are secured to the casing 34 by means of a bolt 60.

In order to steer, and in this case also push the rotary mower that has been depicted, a handle 62 is provided at the rear of the mower.

Inasmuch as it is contemplated that the rotary mower will be employed in situations where damage might result from the casing 34 striking an obstacle, a guard strip 64 of rubber, nylon, Teflon or the like is secured to each side of the cylindrical side wall 36 which projects beyond the wheels 30, 32. Thus, when mowing cemetery lawns, the casing will not damage any of the monuments or gravestones around which the cutting action is taking place; likewise, the bark of trees will not be damaged when my type of mower is used to cut grass in close proximity to the trunks of such trees.

From the foregoing information, it is believed obvious as to how one would use a rotary mower constructed in accordance with the teachings of the present invention. The mower would be pushed by the handle 62, assuming that it is not self-propelled, and would be operated just as any conventional mower is used. The value of the invention is derived from the fact that in mowing lawns of various types certain obstacles are encountered. Thus, when the rotary mower is moved alongside an obstacle, the obstacle will merely deflect the casing 34 to whatever extent is necessary. As already mentioned, the mechanical advantage is considerably greater by having the casing 34 pivoted at its forward side, so the casing is more readily deflected by an obstacle when pivoted in the illustrated manner than if the pin 44 passed through the rear plate 22. Consequently, the grass can be cut very close to the obstacle. When the mower has passed beyond the obstacle, the coil springs 58 merely return the casing 34 to the position in which it appears in the drawing.

By virtue of the invention, the maintenance of lawns, especially where obstacles are met, can be accomplished quickly and at low cost.

It will, of course, be understood that various changes may be made in the form, details, arrangements and proportions of the parts without departing from the scope of this invention as set forth in the appended claims.

What is claimed:

1. A rotary mower comprising:
   (a) a casing having a generally circular, downwardly directed sidewall and oppositely directed horizontal flanges;
   (b) upstanding motor means mounted atop said casing;
   (c) a rotatable blade within said casing and driven by said motor means;
   (d) forwardly and rearwardly disposed transverse plates;
   (e) a pair of laterally spaced side members having their ends secured to the ends of said transverse plates, said side members being elevated intermediate their ends to an extent sufficient to avoid interference with said motor;
   (f) a pair of wheels rotatably associated with the opposite ends of said transverse plates, said plates being of a length such that the wheels of each pair are spaced a lesser distance apart than the diameter of said casing, and
   (g) a vertical pin pivotally connecting one of said horizontal flanges to said rearwardly disposed transverse plate so that the other of said flanges is free to slide upon the forward transverse plate when said casing is swiveled about said pin.

2. A rotary mower in accordance with claim 1 including:
   (a) spring means for normally maintaining said casing in a centrally disposed position.

3. A rotary mower in accordance with claim 2 including:
   (a) guard means carried on the portions of said sidewall extending beyond said laterally spaced side members.

4. A rotary mower comprising:
   (a) a pair of laterally spaced side members, each including upwardly inclining forward and rear portions and an elevated intermediate portion;
   (b) transverse bearing members extending between the forward and rear ends of said side members;
   (c) a casing pivotally supported by one of said transverse bearing members and slidably supported by the other for swivel movement beneath said side members;
   (d) motor means supported on said casing and movable therewith, and
   (e) blade means protected by said casing and rotatably driven by said motor means.

5. A rotary mower in accordance with claim 4 including:
   (a) handle means inclining upwardly from said other transverse member,
   (b) said casing being slidably supported by said other transverse member and pivotally supported by said one transverse member.

References Cited in the file of this patent
UNITED STATES PATENTS
2,960,811    Roesel _____ Nov. 22, 1960